(12) United States Patent
Siegfried Herrmann et al.

(10) Patent No.: US 10,232,573 B2
(45) Date of Patent: Mar. 19, 2019

(54) SYSTEM AND METHOD FOR REPAIRING A COMPONENT MADE OUT OF A PLASTIC

(71) Applicant: Airbus Operations GmbH, Hamburg (DE)

(72) Inventors: Axel Siegfried Herrmann, Stade (DE); Jens Wulfsberg, Hamburg (DE); Georg Lonsdorfer, Stade (DE); Marc Fette, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 430 days.

(21) Appl. No.: 15/008,760

(22) Filed: Jan. 28, 2016

(65) Prior Publication Data

US 2016/0221278 A1 Aug. 4, 2016

(30) Foreign Application Priority Data

Jan. 29, 2015 (DE) .................. 10 2015 101 328

(51) Int. Cl.
*B29C 70/74* (2006.01)
*B29C 73/24* (2006.01)
(Continued)

(52) U.S. Cl.
CPC .......... *B29C 70/745* (2013.01); *B29C 69/001* (2013.01); *B29C 73/02* (2013.01);
(Continued)

(58) Field of Classification Search
CPC ....... B29C 73/02; B29C 73/26; B29C 70/745; B29C 69/001; B29C 2793/0081;
(Continued)

(56) References Cited

U.S. PATENT DOCUMENTS 5,207,541 A    5/1993  Westerman et al.
6,174,392 B1   1/2001  Reis
(Continued)

FOREIGN PATENT DOCUMENTS

DE    3319571 A1    1/1984
DE    4019744 A1    1/1992
DE    102007026099 A1    12/2008
EP    2261012 A1    12/2010

OTHER PUBLICATIONS

European Patent Office, European Search Report for European Patent Application No. 16153145.4 dated Jul. 7, 2016.

*Primary Examiner* — Anthony Calandra
*Assistant Examiner* — Jerzi H Moreno Hernandez
(74) *Attorney, Agent, or Firm* — Lorenz & Kopf LLP (57) ABSTRACT

A system for repairing a component made out of a plastic comprises a frame, a multiaxial guide device coupled with the frame, with a tool holder arranged thereon, an optical acquisition device, a processing device, and a plastic deposition device. The frame comprises a mounting device for retaining the frame on a component surface. The optical acquisition device, the processing device and the plastic deposition device are arranged on the tool holder. The optical acquisition device is set up to optically inspect a surface area of the component lying in proximity to the frame from at least one viewing angle, so as to acquire the spatial structure of the surface area. The processing device is set up to remove material of a damaged area from the component for generating a base surface with a desired structure and boundary edges.

7 Claims, 5 Drawing Sheets

(51) Int. Cl.
*B29C 69/00* (2006.01)
*B29C 73/02* (2006.01)
*B29C 73/26* (2006.01)
*B64F 5/40* (2017.01)
*B29K 101/12* (2006.01)
*B29K 105/12* (2006.01)
*B29L 9/00* (2006.01)

(52) U.S. Cl.
CPC ............... *B29C 73/26* (2013.01); *B64F 5/40* (2017.01); *B29C 2073/264* (2013.01); *B29C 2793/0009* (2013.01); *B29C 2793/0081* (2013.01); *B29K 2101/12* (2013.01); *B29K 2105/12* (2013.01); *B29L 2009/00* (2013.01)

(58) Field of Classification Search
CPC ...... B29C 2793/0009; B29C 2073/264; B29C 64/00; B29L 2009/00; B29K 2101/12; B29K 2105/12; B64F 5/40
See application file for complete search history.

(56) References Cited

U.S. PATENT DOCUMENTS

| | | | |
|---|---|---|---|
| 6,214,279 B1* | 4/2001 | Yang | B29C 41/52 264/308 |
| 6,457,629 B1 | 10/2002 | White | |
| 2002/0019683 A1* | 2/2002 | White | G05B 19/00 700/255 |
| 2009/0324850 A1* | 12/2009 | Gasworth | B29C 73/02 427/578 |
| 2010/0316458 A1* | 12/2010 | Lindgren | B29C 73/10 409/79 |
| 2013/0126675 A1 | 5/2013 | Heppe | |
| 2013/0294644 A1 | 11/2013 | Cork et al. | |
| 2015/0090392 A1* | 4/2015 | Bertrand | B32B 43/00 156/64 |
| 2015/0140147 A1* | 5/2015 | Konstantinos | B33Y 30/00 425/131.1 |

* cited by examiner

SYSTEM AND METHOD FOR REPAIRING A COMPONENT MADE OUT OF A PLASTIC

CROSS-REFERENCE TO RELATED APPLICATIONS

This application claims priority to German Patent Application No. 10 2015 101 328.2, filed 29 Jan. 2015, which is incorporated herein by reference in its entirety.

TECHNICAL FIELD

The embodiments described herein relate to a system for repairing a component made out of a plastic, as well as to a method for repairing a component made out of a plastic.

BACKGROUND

In addition, other objects, desirable features and characteristics will become apparent from the subsequent summary and detailed description, and the appended claims, taken in conjunction with the accompanying drawings and this background.

Components made out of a plastic are often repaired with manual methods, wherein these methods frequently encompass whetting or scarfing the damaged location, introducing plastic and possibly fiber fabric, and finishing the surface treated in this way. Fiber composite repairs often involve the impregnation of semi-finished fiber products prefabricated based on the scarfing geometry, such as woven or nonwoven fabrics based on glass, carbon, natural or aramid fibers. Further known is to use automated methods for milling out damaged areas on the surface of a component, so that manual processing may subsequently take place.

SUMMARY

This is an object to provide a device or system for repairing a component made out of a plastic, which is especially reliable and reproducible, requires only a little manual interaction, and yields a high component quality.

Advantageous further developments and embodiments may be gleaned from the subclaims and following description.

A system for repairing a component made out of a plastic is proposed. The system comprises a frame, a multiaxial guide device coupled with the frame, with a tool holder arranged thereon, an optical acquisition device, a processing device and a plastic deposition device. The frame comprises a mounting device for retaining the frame on a component surface. The optical acquisition device, the processing device and the plastic deposition device are arranged on the tool holder. The optical acquisition device is set up to optically inspect a surface area of the component lying in proximity to the frame from at least one viewing angle, so as to acquire the spatial structure of the surface area. The processing device is set up to remove material of a damaged area from the component for generating a base surface with a desired structure and boundary edges. The plastic deposition device is set up to apply plastic onto the base surface in layers, at least until a repair layer generated by the applied plastic comes to abut flush against the adjacent component surface in an undamaged area.

The system is able to optically inspect damaged areas of a component fabricated out of a plastic, i.e., to precisely and three dimensionally acquire the surface contours or surface topology, remove material to create a surface with the desired structure and defined boundary edges, giving rise to a fillable, defined depression, and subsequently to independently apply plastic until the damaged area has been filled, and hence repaired. To this end, the frame is positioned on the surface of the damaged surface area with the help of the mounting device, wherein the tool holder is mounted so that it may be moved relative to the frame, and hence to the damaged location. The core components of the system will be explained below, along with the tasks achieved by these core components.

The frame is to be regarded as the basis for all devices used to perform the individual steps for processing the component. Its size, in particular its surface area expansion, is adjusted to the devices to be used, and depends on the maximum size of the component damage to be repaired. It should be possible to place the frame over the damaged location by means of the mounting device without influencing how the damaged location is processed, for which purpose enough space should remain around the damaged location. It is generally conceivable for the system to have a modifiable design, so that the retention of the main components only makes the guide device available in modified form or in different sizes. The frame should comprise a high stiffness, and at the same time compensate for oscillations, e.g., by way of the mounting device itself, thereby ensuring dimensional accuracy and reproducibility. Retention should here be enabled in the vertical, overhead and at an inclination.

For purposes of reliable retention, the mounting device may utilize suction cups, in particular those with an active suction device, which permit a sufficient retention force on smooth or largely smooth surfaces.

The multiaxial guide device coupled with the frame is used to move the tool holder relative to the surface of the component, so that the devices located on the tool holder may assume varying positions in relation to the damaged locations. In particular, the guide device consists of two linear guides coupled with each other, which are preferably arranged at an angle of 90° relative to each other. The guide device may correspond to an X-Y surface plotter in terms of its functional principle. The tool holder may hereby be moved to any points on a plane that is spanned by the frame within the frame. In addition to the above, a movement perpendicular thereto should be enabled, so as to support processing and filling with plastic. Furthermore, a high-precision adjustment device based on solid state hinges actuated by piezo actuators would also be possible.

The system may be horizontally aligned to offset weight-induced constraint forces, wherein a non-horizontal alignment of the frame is also possible by using sufficiently dimensioned step motors. In order to simplify the components and production, it may also be beneficial to integrate the guide device directly into the frame.

The optical acquisition device may comprise one or more optical sensors that are suitable for determining the surface structure of the component. Aside from laser-based 3D acquisition, possibilities include structured light projection methods and image acquisition by one or more cameras from different perspectives. A control unit that may be connected with the aforementioned devices is preferably set up to use the data obtained by the optical acquisition device to generate a 3D model of the acquired structure, which represents the damaged location. The extent and shape of the damaged location is thereby precisely defined relative to a coordinate system spanned by the frame. The plastic may then be applied by using the knowledge of this 3D model, taking into account the characteristic properties of the selected plastic deposition device.

The processing device may comprise at least one cutting tool, which may be brought into contact with the damaged surface, so as to remove material there. The at least one cutting tool may comprise mechanical cutting means, which may be brought into mechanical contact with the surface of the component, and remove material step by step while performing a rotational or linear motion, guided by the movement of the tool holder. After the spatial structure of the damaged location has been acquired, the tool holder, which is movably situated on the frame, may actuate the at least one cutting tool as prescribed by a control unit or the like in such a way as to thereby generate a largely homogeneous base surface, in particular with clear boundary edges, and remove any fraying that might be present. It is further conceivable to provide the base surface with a structure in which a macrostructural gearing leads to an improved adhesion of the applied plastic and plastic of the component. As soon as chips and the like have been removed through suction or blowing with the help of an integrated or external device, this base surface may serve as the foundation for a plastic to be applied.

If desired, the at least one cutting tool may be used to fine machine the surface of the subsequently filled plastic, so as to achieve a homogeneous surface of the repaired component. Suitable in particular for improving the macrostructure of the component on the base surface are milling means, for example end mills, for machining the damaged location. Alternatively, abrasives or laser-based tools could also be used, if it may be ensured that grinding residues will not be undesirably introduced into the plastic of the component, or a precise machining depth will be maintained with laser-based tools.

Finally, the plastic deposition device is set up to apply plastic from a reservoir onto the base surface, doing so via linear or flat deposition, depending on the type and design. Moving the tool holder within the plane spanned by the frame precisely specifies the deposition direction and deposition location, which are controlled by the control unit as a function of the previously generated 3D model.

The plastic to be deposited by the plastic deposition device is here not limited to a specific type of plastic. Possible aside from thermoplastics are curable, resin-based plastics. In addition, it is conceivable that several different types of plastics may be applied to the component in various machining stages. For example, a first plastic could be applied to the base surface to fill the damaged area, to be followed by the application of an additional protective layer to safeguard against weathering influences, possibly after the surface has been subjected to finishing treatment with the at least one cutting tool.

Let it be noted in this conjunction that the system may also be set up and made to apply an excess amount of plastic, so that only the final mechanical processing of the surface results in a repaired location that is flush with surrounding, undamaged areas. After machined, the repaired location is then adjusted to the old or surrounding level, completely without any burrs and bulging. In particular in airplanes, this may lead to a reduced drag owing to the resultantly achieved smooth surface, but may also be advantageous in vehicles when it comes to visual appearance.

In summary, the system may autonomously perform several consecutive processing steps for repairing a damaged area of a component made out of a plastic, without requiring any complicated manual interaction. In particular, the repair may serve as a long-term repair solution for thermoplastics, while use in fiber-reinforced thermoplastics or duromers may also be geared for temporary repairs, so as to limit the damage or tear propagation, so that the corresponding component may be brought to a workshop or repair device suitable for initiating the proper repairs.

The plastic deposition device preferably comprises a deposition nozzle, through which plastic is deposited to the outside from a reservoir. A single plastic layer may be generated by continuously coating a plastic streaming out of the deposition nozzle onto the base surface. Sequentially generating plastic layers also makes it possible to fill larger depths of the damaged area of the component. The deposition nozzle may be designed both as a caterpillar nozzle, which may generate caterpillar-like plastic webs, and as a slit nozzle, which may generate flat plastic webs.

In an especially advantageous embodiment, the deposition nozzle is pivotable around an axis perpendicular to a deposition direction of the deposition nozzle. The present deposition direction relative to the frame may thereby be selectively set, which in particular makes it possible to deposit plastic not perpendicularly to the frame, but rather at an inclination. As a consequence, in particular edges of the base surface may be filled flush with plastic, which counteracts the formation of cavities.

In an advantageous embodiment, the plastic deposition device is set up to deposit a plastic mixed with reinforcing fibers. As a result, a reservoir coupled with the plastic deposition device may comprise a mixture of plastic and reinforcing fibers, wherein the reinforcing fibers are randomly aligned, thereby enabling a quasi-isotropic structure for a fiber-reinforced plastic layer.

In just as advantageous of an embodiment, the plastic deposition device is set up to mix fibers from a fiber reservoir into a plastic stream to be deposited. For example, a plastic and fibers may be deposited simultaneously from a deposition opening, wherein the fibers may be guided out at one or several cross sectional areas of the deposition opening, depending on the type and size of the deposition opening. As a consequence, fibers are simultaneously placed in a desired direction and covered with plastic. Depending on the traveling direction of the tool holder, this enables a repair that is especially well adapted to the load. In this case, it is conceivable for the fiber reservoirs to be designed as spools or rolls that may deposit fibers. The plastic deposition device may further also comprise a fiber cutting device, with which the deposited fiber lengths are limited, for example to generate fiber webs running parallel to each other.

However, fibers may also be deposited by a separate fiber deposition device, which is arranged on the tool holder, and set up to place fibers on the base surface through the movement of the fiber deposition device, after which a plastic layer may be applied. In order to improve initial adhesion, the fibers should be applied to a surface section already wetted with plastic, or, as an alternative, it would be possible to embed the fibers under a plastic layer immediately after placement. The fiber deposition device may be a fiber deposition unit or a fiber deposition head. For this purpose, the fibers to be deposited should preferably comprise a certain adhesiveness, for example as the result of pre-impregnation, so as to ensure an exact deposition and fixation on the surface.

It is favorable for the plastic deposition device to comprise a heating device and a reservoir for a thermoplastic plastic, wherein the plastic is liquefiable for deposition by heating with the heating device. The heating device may be located at one end of the reservoir, and by exerting a mechanical pressure on the plastic, convey the latter to a deposition nozzle in liquefied form.

In addition, it is especially advantageous for the system to comprise a testing device having at least one sensor and situated on the tool holder for the non-destructive material examination of the repair layer and adjacent areas. After the surface has been completely repaired and finished, the material examination may reveal whether undesired cavities or other flaws are in the repair layer or adjacent areas, so as to again effect repairs as needed. During fiber deposition, it would be advantageous to have an optical acquisition system to check the fiber orientation or a present angular deviation.

In order to further improve the base surface, an atmospheric pressure plasma method may be implemented, with which the base surface is cleaned and activated after chips have been suctioned or blown off, thereby increasing the adhesion of the subsequently applied plastic. A corresponding plasma nozzle is to be arranged on the tool holder, and made traversable according to the linear axes.

This relates to a method for repairing a component made out of a plastic, which encompasses the steps of placing a frame onto a component, optically acquiring a damaged structure of the component with an optical acquisition device arranged on a tool holder situated on a multiaxial guide device coupled with the frame, removing material from the damaged area of the component for generating a base surface with a desired structure and boundary edges, and applying plastic onto the base surface in layers by means of a plastic deposition device until a repair layer generated by the applied plastic comes to abut flush against the adjacent component surface in an undamaged area.

The method may further involve optically acquiring the base surface with the optical acquisition device, so as to acquire the spatial structure of the base surface after processing with the processing device, wherein the layer-by-layer application of plastic is controlled as a function of the spatial structure of the base surface and a layer thickness achievable with the plastic deposition device.

It is further advantageous for the method described above to encompass optically acquiring the repair layer and an adjacent, undamaged area of the component, so as to acquire the spatial structure of the repair layer and the adjacent, undamaged area of the component, determining an excess material thickness of the repair layer relative to the adjacent, undamaged area of the component, and removing the excess material thickness of the repair layer to generate a homogeneous surface between the repair layer and adjacent, undamaged area of the component.

As mentioned above, the layer-by-layer application of plastic may involve the continuous or repeated deposition of fibers by means of a fiber deposition device for manufacturing a repair layer in the form of a fiber composite material. The fibers may be mixed in with a plastic stream to be deposited, or separately placed by a fiber deposition device before the plastic is applied.

The method may further involve the activation of the base surface with an atmospheric pressure plasma method after the material has been removed and before the plastic is applied.

Finally, as already mentioned above, the method may further involve the non-destructive material testing of the repair layer and adjacent areas by means of a testing device that has at least one sensor and is arranged on the tool holder.

BRIEF DESCRIPTION OF THE DRAWINGS

The various embodiments will hereinafter be described in conjunction with the following drawing figures, wherein like numerals denote like elements.

Additional features, advantages and possible applications may be gleaned from the following description of the exemplary embodiments and the figures. All described and/or graphically illustrated features here comprise the subject matter, whether taken in isolation or in any combination desired, even independently of their composition in the individual claims or back references thereto. Furthermore, identical reference numbers on the figures stand for the same or similar objects.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
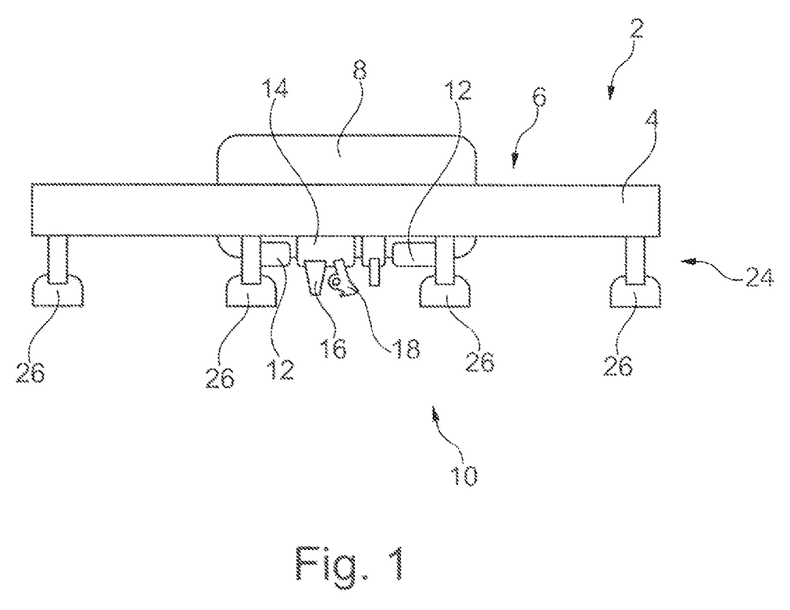
FIG. 1 shows a system for repairing a component made out of a plastic.

FIG. 1 shows the essential features of a system 2 for repairing a component made out of a plastic, wherein the system comprises a frame 4, a multiaxial guide device 6 coupled with the frame 4, and a tool holder 8 arranged thereon, which accommodates an optical acquisition device 10 with two optical sensors 12. The tool holder 8 further carries a plastic deposition device 14, which has a deposition nozzle 16 and a fiber deposition device 18 that is separate or coupled with the plastic deposition device 14, and further may be rotated around at least one axis perpendicular to a deposition direction 20 of the nozzle 16.

Further arranged on the tool holder 8 is a processing device 22 that may also be moved in the vertical direction to control the cutting depth relative to the frame 4.

The frame 4 also comprises a mounting device 24 with suction cups 26, which are set up to retain the frame 4 on the surface of the component. As an additional option, it would be conceivable to move the system 2 on the component surface by selectively activating and moving the individual suction cups 26, so as to process two or more damaged locations in succession, for example. The combination of these features makes it possible to implement the method, as shown on the following FIG. 2A to 2H.

Figure 2A:
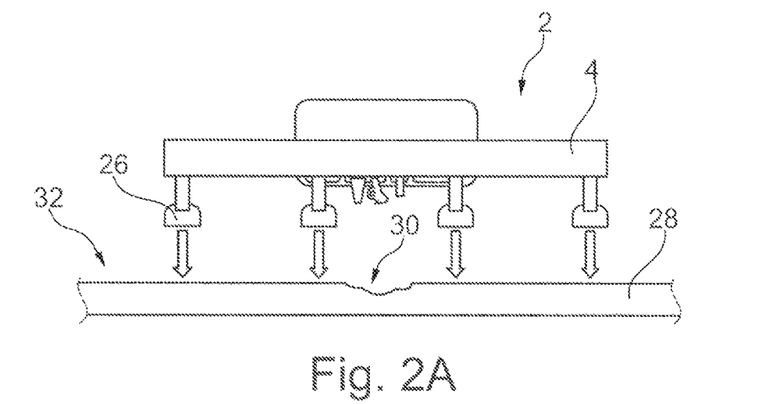
FIG. 2A-FIG. 2H show consecutive procedural steps of a method for repairing a component made out of a plastic.

In FIG. 2A, the system is placed on a component 28 that comprises a damaged area 30. The latter extends from a surface 32 of the component 28 into its material. By placing the system 2 on the component 28, the suction cups 26 may adhere to the surface 32, so that the actual procedural steps for repairing the damaged area 30 may be initiated.

Figure 2B:
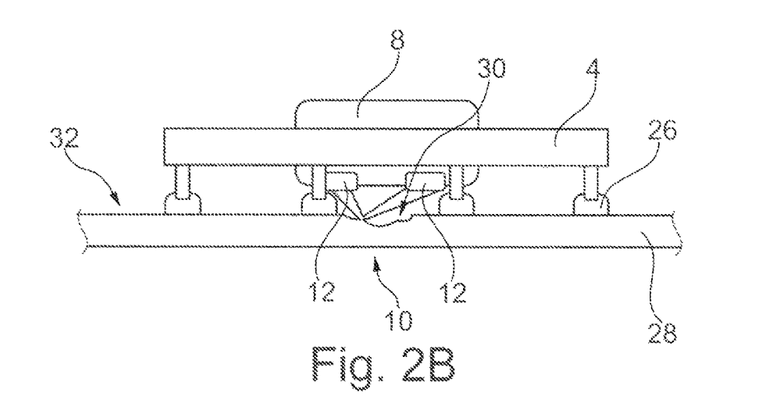

On FIG. 2B, the optical sensors 12 of the optical acquisition device 10 scan the structure of the damaged area 30, so that a control unit (not shown) is provided with information about the structural scope of the damaged area 30, and generate a 3D model or an approximation of the latter, for example. The optical sensors may here each assume one or more viewing angles, and scan the damaged area 30 along a striped or other type of pattern until enough data have been gathered to sufficiently acquire the structure of the damaged area.

In order to acquire the structure, the tool holder 8 may be moved along the frame 4 toward the component surface 32, so as to establish a corresponding perspective or a favorable distance between the acquisition units 12 and component surface 32. Moving the tool holder 8 allows the acquisition device 10 to analyze the entire area of the component 28 enveloped by the frame.

Figure 2C:
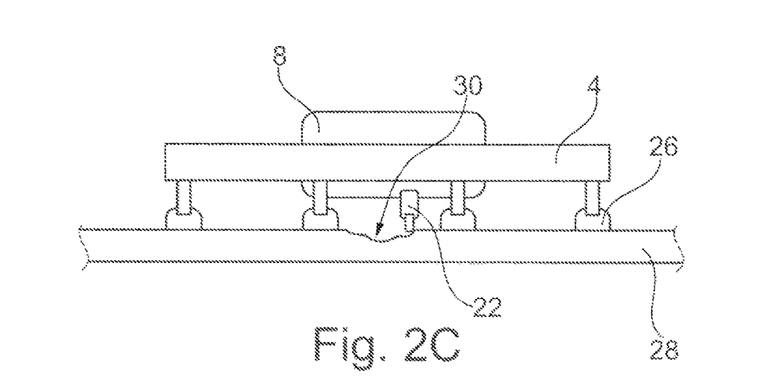

As shown on FIG. 2C, the processing device 22 may then process the damaged area 30 in such a way as to yield a smooth or homogeneous base surface. For this purpose, the tool holder 8 may be moved parallel to the component surface 32, and the processing device 22 may preferably be moved perpendicularly thereto.

Figure 2D:
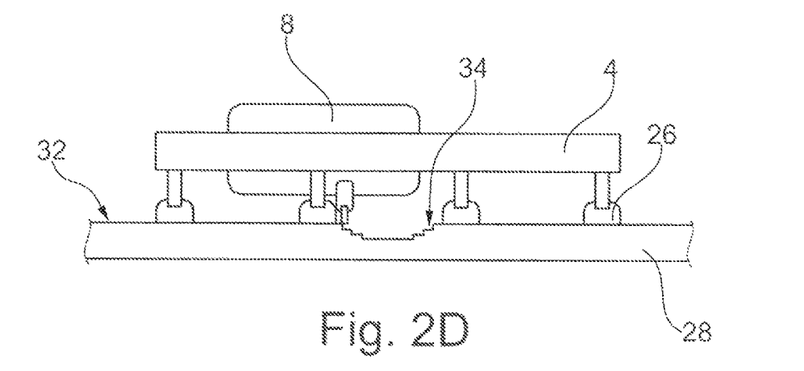
Figure 2E:
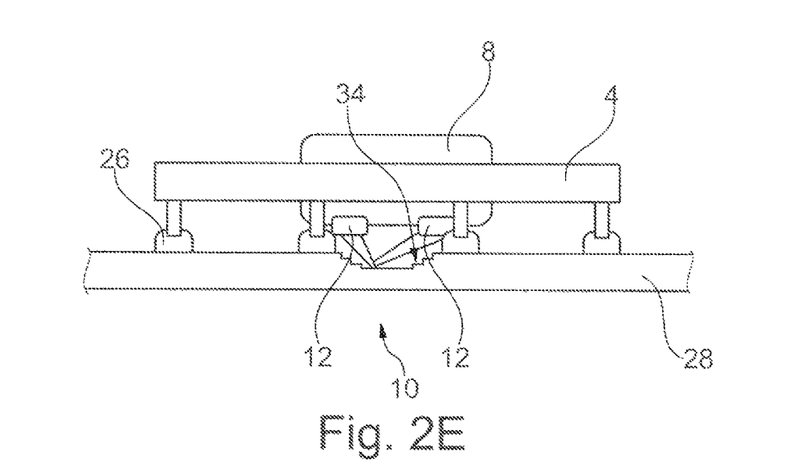

As shown on FIG. 2D, a homogeneous base surface 34 is then generated, which comprises defined expansions both parallel to the component surface 32 and perpendicularly thereto. The base surface 34 may comprise stepped, outwardly expanding boundary edges 40.

The structure obtained in this way is then examined once again by the optical acquisition device 10, so that an exact spatial image of the base surface 34 may be generated. This is depicted on FIG. 2E.

Figure 2F:
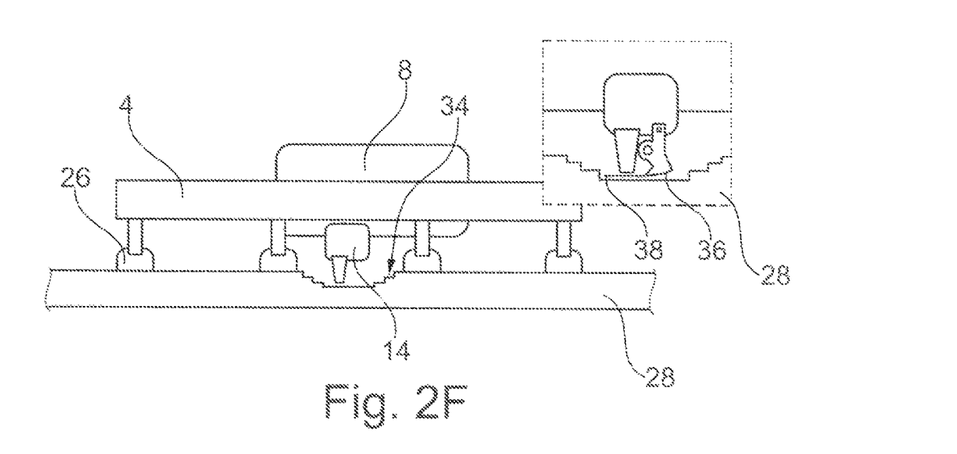
Figure 2G:
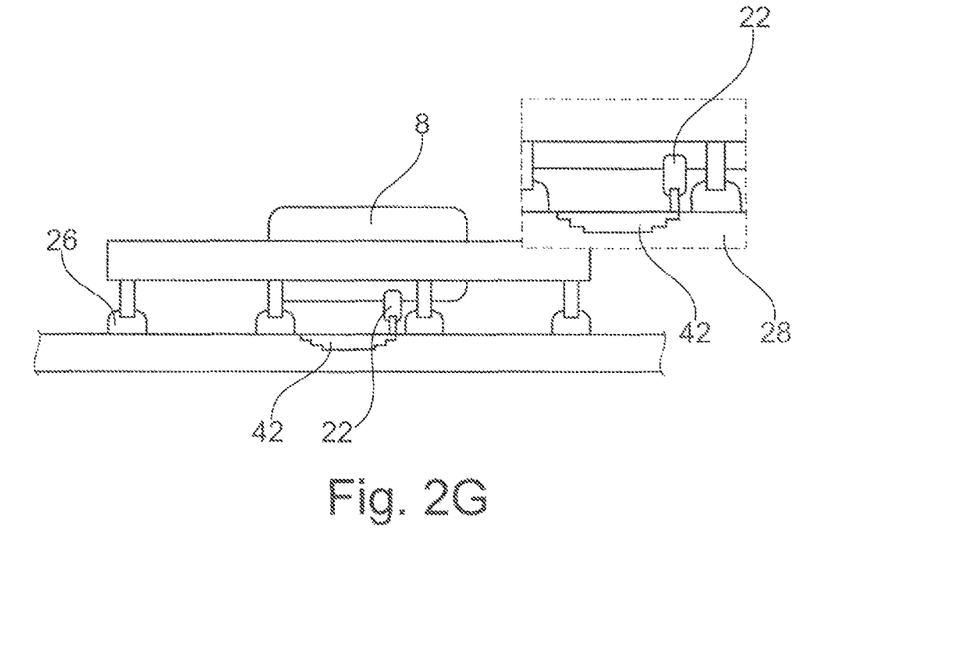

The plastic deposition device 14 then deposits layers of plastic onto the base surface 34, as depicted in FIG. 2F, and preferably fills the latter layer by layer. For this purpose, the tool holder 8 is moved over the entire base surface 34 in regular webs as a function of the acquired model of the base surface 34, and the plastic deposition device periodically deposits plastic, either continuously or depending on how the webs are interrupted.

As shown in one section on a magnified scale, fibers 36 may be applied at the same time that the plastic is deposited. These are then preferably embedded into the plastic 38 in a traveling motion, thereby giving rise to a fiber-reinforced plastic, which abuts flush against the boundary edges 40 of the base surface.

The surface of the repair layer 42 may then be processed once more by the processing device 22, thereby resulting in a homogeneous surface. This is depicted on FIG. 2G. Prior to this step, the structure may be subjected to another optical acquisition.

Figure 2H:
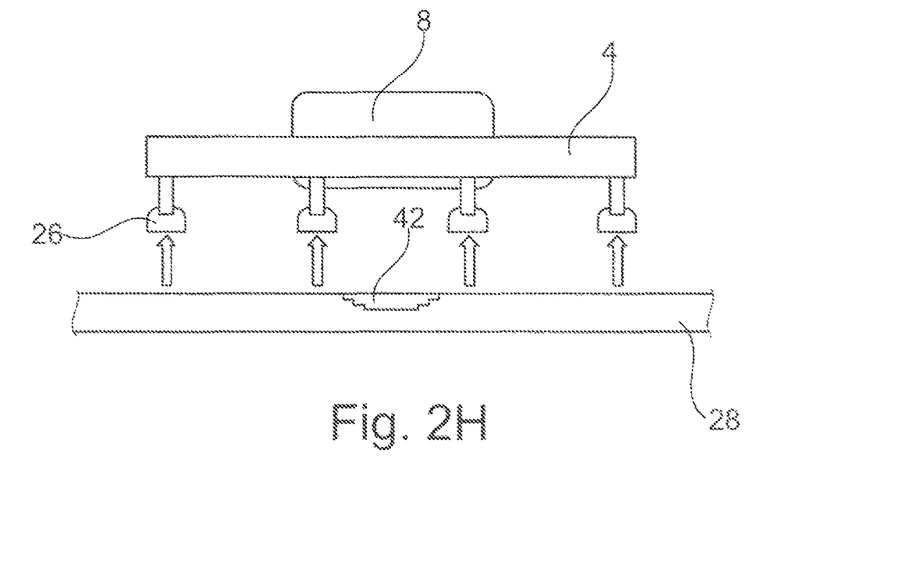

The system 2 may then be removed again, as depicted on FIG. 2H. It may further be advantageous for the system 2 to comprise an ultrasound sensor (not shown), which examines both the repair layer and transitions between the repair layer and component surface 32. This makes it possible to gain knowledge about the present quality of the repair.

As an alternative thereto, such an ultrasound examination may also be performed using separate devices.

Figure 3:
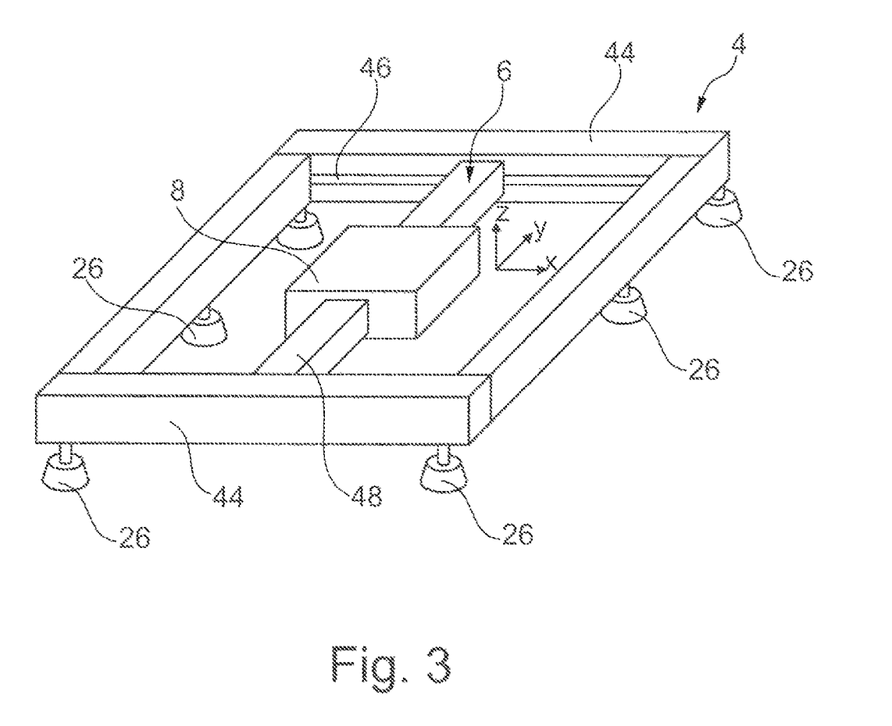
FIG. 3 shows a simplified spatial view of the system to provide a better understanding.

Finally, FIG. 3 shows a somewhat simplified, spatial view of the system 2 with an exemplarily rectangular frame 4, on which the guide device 6 is mounted. To this end, two opposing frame elements 44 each comprise a guide rail 46, for example, which may be designed as a groove in the frame elements 44, or as a separate, superimposed guide rail 46. Guided therein is a retaining arm 48, to which the tool holder 8 is fastened, and may be moved by means of driving devices (not shown) perpendicular to the plane spanned by the frame 4, i.e., in the z-direction of the indicated coordinate system, on the retaining arm 48, and along its extension, i.e., in the y-direction. By arranging another driving device (not shown) on the frame 4, a traveling motion takes place along the guide rails 46, i.e., in the x-direction of the indicated coordinate system.

Of course, the frame 4 may also comprise a completely different structural design. However, it is advantageous that the frame 4 be stiff enough to allow a high return accuracy, i.e., reproducibility of the positions reached by the tool holder 8, so that the contours determined via optical acquisition may be precisely used for controlling the application of plastic.

In addition, let it be noted that "comprise" does not rule out any other elements or steps, and that "a" or "an" do not preclude a plurality. Let it further be noted that features described with reference to one of the above exemplary embodiments may also be used in combination with other features of other exemplary embodiments described above. Reference numbers in the claims are not to be construed as a limitation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A system for repairing a component made out of a plastic, comprising:
    a frame comprising a mounting device to retain the frame on a surface of the component,
    a multiaxial guide device coupled with the frame, with a tool holder arranged thereon, the multiaxial guide device controllable to move the tool holder relative to the frame,
    an optical acquisition device arranged on the tool holder and configured to optically inspect a surface of the component lying in proximity to the frame from at least one viewing angle to acquire a spatial structure of the surface area,
    a processing device arranged on the tool holder and configured to remove material of a damaged area from the component, wherein movement of the tool holder is controlled such that the processing device generates a base surface with a desired structure and boundary edges,
    a plastic deposition device arranged on the tool holder and configured to apply plastic onto the base surface in layers, at least until a repair layer generated by the applied plastic abuts flush against an adjacent component surface in an undamaged area, the plastic deposition device comprising a deposition nozzle through which the plastic is deposited, the deposition nozzle pivotable around an axis perpendicular to a deposition direction of the deposition nozzle, and
    a fiber deposition device arranged on the tool holder and configured to deposit reinforcing fibers onto the base surface such that reinforcing fibers deposited from the fiber deposition device cooperate with plastic deposited from the plastic deposition device, the fiber deposition device rotatable around at least one axis perpendicular to the deposition direction of the deposition nozzle.

2. The system of claim 1,
    wherein plastic is deposited through the deposition nozzle from a reservoir.

3. The system of claim 1,
wherein the plastic deposition device is set up to deposit a plastic mixed with reinforcing fibers.

4. The system of claim 1, wherein the plastic deposition device is set up to mix fibers from a fiber reservoir into a plastic stream to be deposited.

5. The system of claim 1, wherein the plastic deposition device comprises a heating device and a reservoir for a thermoplastic plastic, wherein the plastic is liquefiable for deposition by heating with the heating device.

6. The system of claim 1, further comprising a plasma nozzle, which is set up to activate the base surface in an atmospheric pressure plasma method.

7. The system of claim 1, further comprising a testing device having at least one sensor and situated on the tool holder for the non-destructive material examination of the repair layer and adjacent areas.

\* \* \* \* \*